United States Patent
Putti

[11] 3,904,341
[45] Sept. 9, 1975

[54] MACHINE FOR EXTRUDING CEMENT-LIKE MATERIAL INTO ARTICLES

[75] Inventor: George Putti, North Vancouver, Canada

[73] Assignee: Dyform Concrete (Prestressed) Ltd., Vancouver, Canada

[22] Filed: Mar. 21, 1973

[21] Appl. No.: 343,525

[52] U.S. Cl. .............. 425/382; 425/64; 425/469
[51] Int. Cl.² ........................................ B28B 21/52
[58] Field of Search .............. 425/63, 64, 382, 469; 264/167, 333

[56] References Cited
UNITED STATES PATENTS

| | | | |
|---|---|---|---|
| 1,012,232 | 12/1911 | Balg | 264/167 |
| 1,480,010 | 1/1924 | Roberts et al. | 425/469 |
| 2,818,790 | 1/1958 | Canfield et al. | 425/64 X |
| 3,137,220 | 6/1964 | Smith | 425/64 X |
| 3,138,079 | 6/1964 | Smith | 425/64 X |
| 3,159,897 | 12/1964 | Ellis et al. | 425/427 |
| 3,212,154 | 10/1965 | Crumpler | 425/382 X |
| 3,801,249 | 4/1974 | Milani | 425/463 X |

Primary Examiner—R. Spencer Annear
Attorney, Agent, or Firm—Fetherstonhaugh & Co.

[57] ABSTRACT

An extrusion machine for continuously making articles such as concrete slabs by forcing the article forming material through a mold, the machine being moved forwardly by reaction as the material is forced against the portion of the article already formed. The machine has a mold with a transverse plate at its upstream end and forming elements extending downstream from the plate within the mold. Adjacent to the forming elements, the plate is apertured, the apertures being connected to ducts upstream at the plate along which the concrete-like material is fed by screw conveyors into the mold.

11 Claims, 6 Drawing Figures

MACHINE FOR EXTRUDING CEMENT-LIKE MATERIAL INTO ARTICLES

This invention relates to extrusion machines for making articles, such as slabs, panels, beams and the like from suitable moldable material such as concrete. The moldable material used is a relatively stiff mix and rapidly sets to a relatively solid state. For the sake of convenience, the invention will be described herein relative to the making of cored slabs of concrete.

A machine for making slabs of this kind is illustrated and described in U.S. Pat. No. 3,159,897 dated Dec. 8, 1964. This patent discloses a machine having a plurality of screw conveyors each with a flight fixed to the core shaft thereof. Each screw conveyor has a trowelling mandrel secured to the downstream end thereof so that it rotates with the core shaft. With such an arrangement, slabs can only be extruded in which the cores are coaxial with the screw conveyors. Moreover, since the trowelling mandrel rotates, the cores are unavoidably circular in cross-section. Furthermore, it is required to form slabs having cores of differing sizes, it is necessary to provide a number of screw conveyors for substitution in the machine having a range of sizes of trowelling mandrel. In addition, in the event of a screw conveyor wearing out, a frequent occurrence in concrete extrusion machines, it is necessary to replace the whole conveyor and trowelling mandrel.

It is among the objects of the present invention to provide an extrusion machine in which the screw conveyors are separate units and in which slabs can be formed having cores of any cross-sectional configuration and which are substantially independent of the conveyor positioning.

The invention therefore provides, in an extrusion machine for making elongated articles of concrete-like material by forcing the material through a mold, said machine being moved forwardly by reaction as the material is forced against the molded portion of the article, the improvement which comprises a transverse plate positioned across the upstream end of the mold and having forming means mounted thereon so as to extend downstream from the plate within the mold, the transverse plate being apertured adjacent to said forming means for the introduction of said concrete-like material into the mold, at least one duct disposed upstream of said transverse plate and communicating with said mold through said transverse plate, each duct having an inlet and including pumping means for feeding said concrete-like material from said inlet and through said transverse plate into said mold.

Two embodiments of the invention will now be described by way of example with reference to the accompanying drawings in which.

Figure 1:
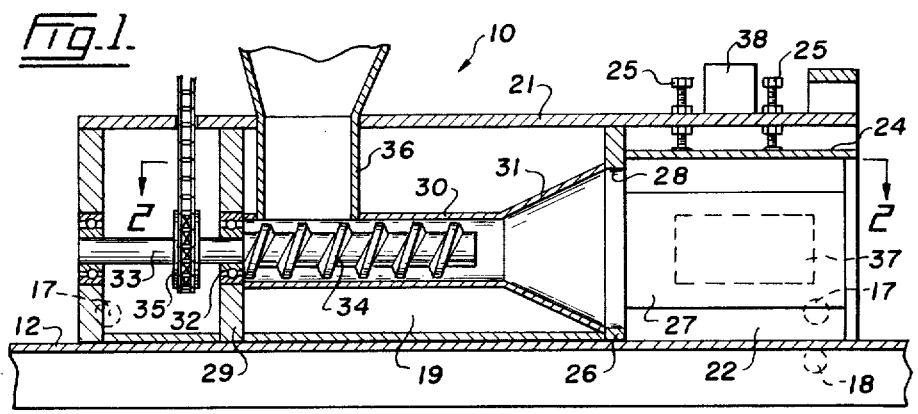
FIG. 1 is a sectional side elevation of an extrusion machine embodying the features of the invention.
Figure 2:
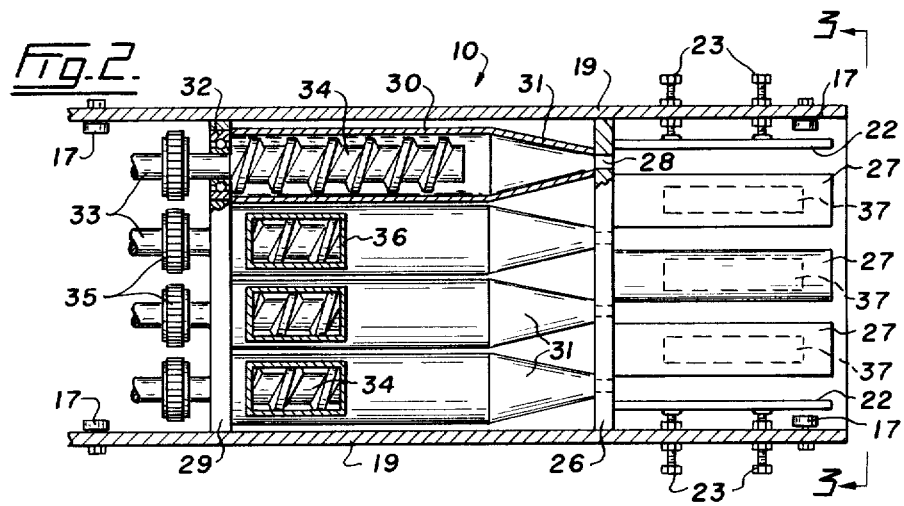
FIG. 2 is a plan view, partly in section, on the line 2—2 of FIG. 1.
Figure 3:
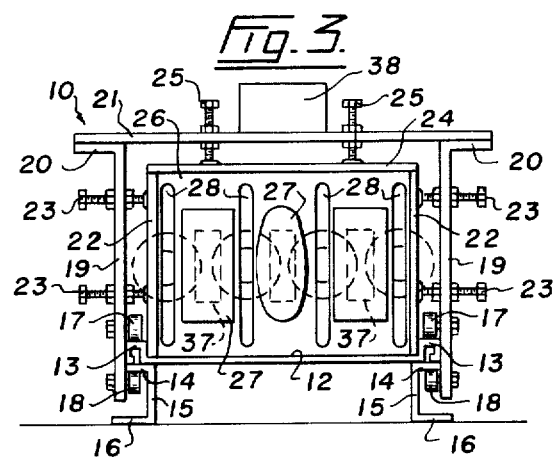
FIG. 3 is an end view on the line 3—3 of FIG. 2.

Referring to FIGS. 1 to 3 of the drawings, the extrusion machine 10 shown is adapted to move over any suitable base in order to form articles of moldable material such as concrete slabs. The articles may be formed on the ground in position in which they are intended to remain or on any other suitable base which constitutes the bottom surface of the mold of the machine. In this example, the machine moves along a base 12 formed with box-section sides 13. Each of the sides 13 rests on and is welded to the upper flange 14 of an outwardly facing channel member 15. The lower flanges 16 of the channel member rest on and are secured to the ground. The box sections 13 and the upper flanges 14 of the channels together form tracks which are engaged above and below on each side of the machine by rollers 17 and 18 respectively. The rollers 17 and 18 are journalled in the sides 19 of the machine, the sides 19 having flanges 20 at their upper edges across which a top plate 21 is welded.

Within one end of the machine a pair of side molding plates 22 are mounted for lateral adjustment by means of adjustment screws 23. Each screw 23 has a hexagon head and extends through screw threaded bosses in the side plates 19. The ends of the screws are captured so as to be rotatable in bearings secured on the outer faces of the molding plates 22. A top molding plate 24 is similarly adjustable in a vertical direction by means of adjustment screws 25 extending through the plate 21.

At the upstream end of the molding plates 22 and 24 a transverse plate 26 is secured across the machine between the plates 19. The transverse plate 26 has mounted thereon a number of forming elements 27 extending within the mold, and which can be of any configuration and arranged in any desired pattern according to the required positions of the cores in the slab to be molded. Within the unobstructed areas of the plate 26, apertures 28 are formed, preferably extending as vertical slots between the forming members 27, as best seen in FIG. 3.

Towards the other end of the machine, a transverse plate 29 is located and secured between the plates 19 and 21. Between the plates 29 and 26, a number of circular ducts 30 are located corresponding to the number of slots 28 (four in the example shown). At the downstream end of each duct 30, a transition piece 31 is provided, which flares vertically and tapers horizontally into conformity with the configuration of the slot 28 to which it is connected.

The wall 29 has a sealed bearing 32 mounted therein in axial alignment with each duct 30. A shaft 33 extends through each bearing 32 and carries thereon a screw conveyor 34 within the duct. Each shaft 33 carries suitable means 35, such as a sprocket and chain, for transmission of power to rotate the conveyor 34 connected thereto. Towards the upstream end of each duct 30, a hopper 36 is connected thereto in order to feed concrete or concrete-like material to the screw conveyor 34.

Vibrators may also be provided, either internally of the forming elements 27, as indicated in broken lines at 37 or externally of the mould as indicated at 38. The vibrators can be of conventional design and are not further described.

In operation, the transverse plate 26 carrying formers 27 in a desired configuration is first positioned within the machine in the position indicated and the molding plates 22 and 24 adjusted by means of the screws 23 and 25 to the desired spacing. Concrete to be molded is then fed in through the hoppers 36 and the screw conveyors 34 caused to rotate. The concrete is fed by the screw conveyors through the transition pieces 31 and slots 28 into the mold defined by the plates 22 and 24 and by the forming elements 27. Movement of the machine along the tracks 13/14 is effected by reaction of the machine against the article being molded as it rests upon the base 12.

Figure 4:
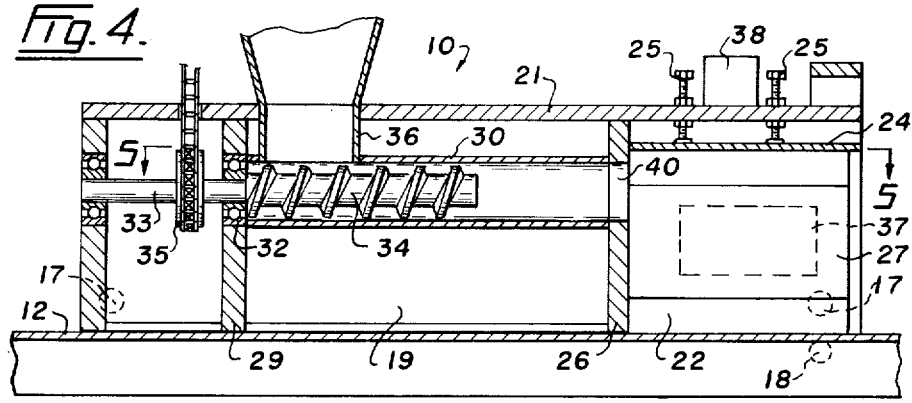
FIGS. 4, 5 and 6 are a sectional side elevation, plan view and end view corresponding to FIGS. 1, 2 and 3, of a modified extension machine embodying the features of the invention.
Figure 5:
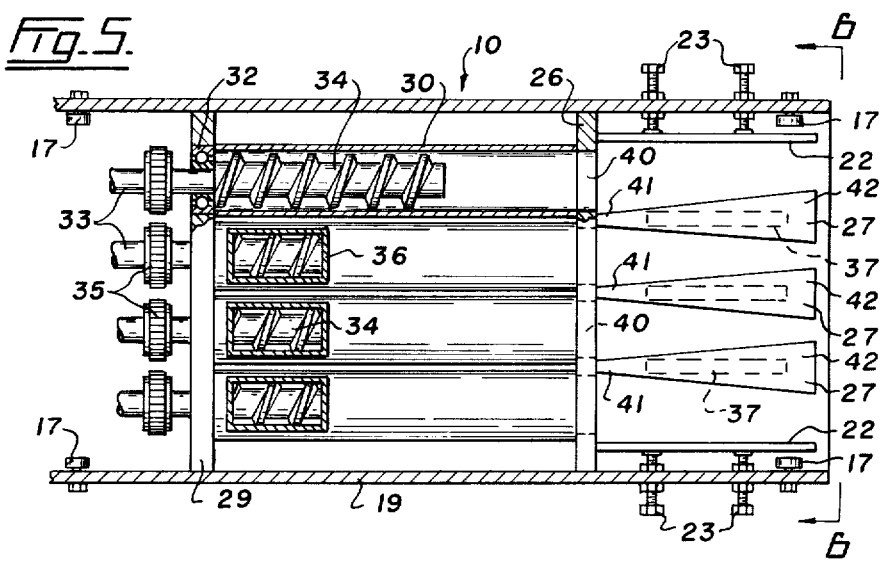
Figure 6:
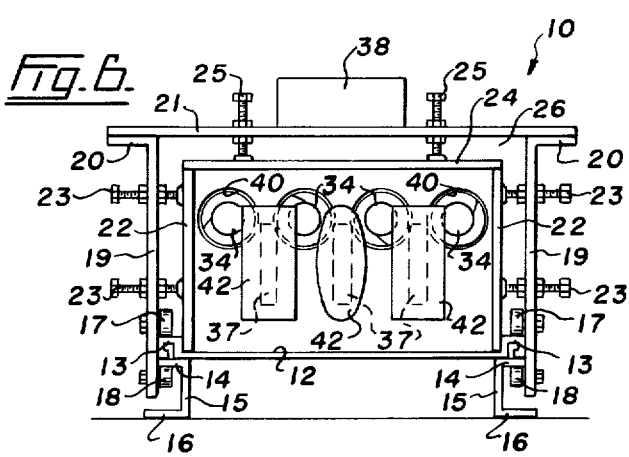

Turning now to FIGS. 4 to 6, the extrusion machine shown therein is a modification of that shown in FIGS. 1 to 3 and corresponding features are identified by the same reference numerals.

The embodiment of FIGS. 4 to 6 differs however in that the transverse plate 26 is formed with circular apertures 40 in place of the slots 28, the apertures 40 and the ducts 30 connected thereto being at a higher level than the forming elements 27. The apertures 40 are of the same diameter as the ducts 30 so that no transition pieces 31 are provided. However, it will be appreciated that such transition pieces could be provided if there were any dissimilarity between the cross-sections of ducts 30 and apertures 40.

The forming elements 27 flare from a narrow root portion 41 secured to the plate 26 to a downstream end 42 at which the cross-section is of the desired moulding configuration.

The operation of the machine shown in FIGS. 4 to 6 is substantially identical to that of FIGS. 1 to 3. The positioning of the apertures 40 at a higher level than the moulding elements 27 assists in providing concrete at the higher levels in the mould. The lower levels are filled by the gravitational settlement of the concrete during its movement along the mould.

I claim:

1. In an extrusion machine for making elongated articles of concrete-like material by forcing the material through a mold, said machine being moved forwardly by reaction as the material is forced against the molded portion of the article, the improvement which comprises a fixed transverse plate positioned across and closing the upstream end of the mold and having at least one elongated forming element mounted at an end thereof on the plate and supported thereby so as to extend downstream from the plate within the mold, the transverse plate being apertured adjacent to but out of line with said end of said forming element for the introduction of said concrete-like material into the mold, at least one duct disposed upstream of said transverse plate and communicating with said mold only through an aperture of said transverse plate, each duct having an inlet and including pumping means for feeding said concrete-like material from said inlet and through the associated aperture of said transverse plate into said mold and around said forming element.

2. An extrusion machine as claimed in claim 1, wherein each of said ducts has a cross-sectional configuration differing from the aperture configuration, and wherein a transition piece is provided at the downstream end of each duct, which connects said duct to an aperture of the plate.

3. An extrusion machine as claimed in claim 2 wherein said transverse plate is formed with a plurality of apertures in the form of vertically oriented slots, and wherein said ducts are of circular cross-section, with said transition pieces flaring vertically and tapering horizontally into conformity with the slot configurations.

4. An extrusion machine as claimed in claim 1, wherein said transverse plate is formed with apertures at a level above said forming means.

5. An extrusion machine as claimed in claim 1, wherein said pumping means comprises a screw conveyor mounted in each duct.

6. An extrusion machine as claimed in claim 1, wherein there are a plurality of forming elements extending in axially parallel relation from said transverse plate.

7. An extrusion machine as claimed in claim 6, wherein said forming elements each flare from a root secured to said transverse plate to a downstream end at which the cross-section is of the desired moulding configuration.

8. An extrusion machine for making elongated articles of concrete-like moldable material forcing the material through a mold, said machine being moved forwardly by reaction as the material is forced against the molded portion of the article, said machine comprising,
a track,
a frame mounted for horizontal movement in said track,
side and top molding plates mounted within one end of said frame for lateral and vertical adjustment respectively to selectively vary the external dimensions of the article to be molded,
a transverse plate positioned across said frame at the upstream ends of said molding plates and having at least one forming element mounted at an end thereof on the plate and supported thereby so as to extend downstream from the plate within the mold, the transverse plate being formed with apertures at positions adjacent to but out of line with said ends of the forming element for the introduction of said concrete-like material into said mold,
a plurality of ducts of circular cross-section disposed upstream of said transverse plate, each duct having an inlet in the region of the upstream end, and being connected to one of said apertures in said transverse plate,
a plurality of screw conveyors disposed one in each duct for feeding said concrete-like material along the ducts and through said apertures into said mold,
sealed bearing means axially aligned with each screw conveyor at the upstream end of each duct, and
a drive shaft extending through each sealed bearing and connected for driving the screw conveyor in the respective duct.

9. An extrusion machine as claimed in claim 8, wherein said transverse plate is formed with apertures in the form of vertical slots on each side of each forming element, the vertical slots being connected to the ducts by transition pieces.

10. An extrusion machine as claimed in claim 8, wherein each forming element flares from a root secured to said transverse plate to a downstream end at which the cross-section is of the desired moulding configuration, and wherein said transverse plate is formed with apertures at a level above said forming elements and alternating therewith.

11. An extrusion machine as claimed in claim 8, wherein each forming element flares from a root secured to said transverse plate to a downstream end at which the cross-section is of the desired moulding configuration.

* * * * *